Patented Oct. 8, 1946

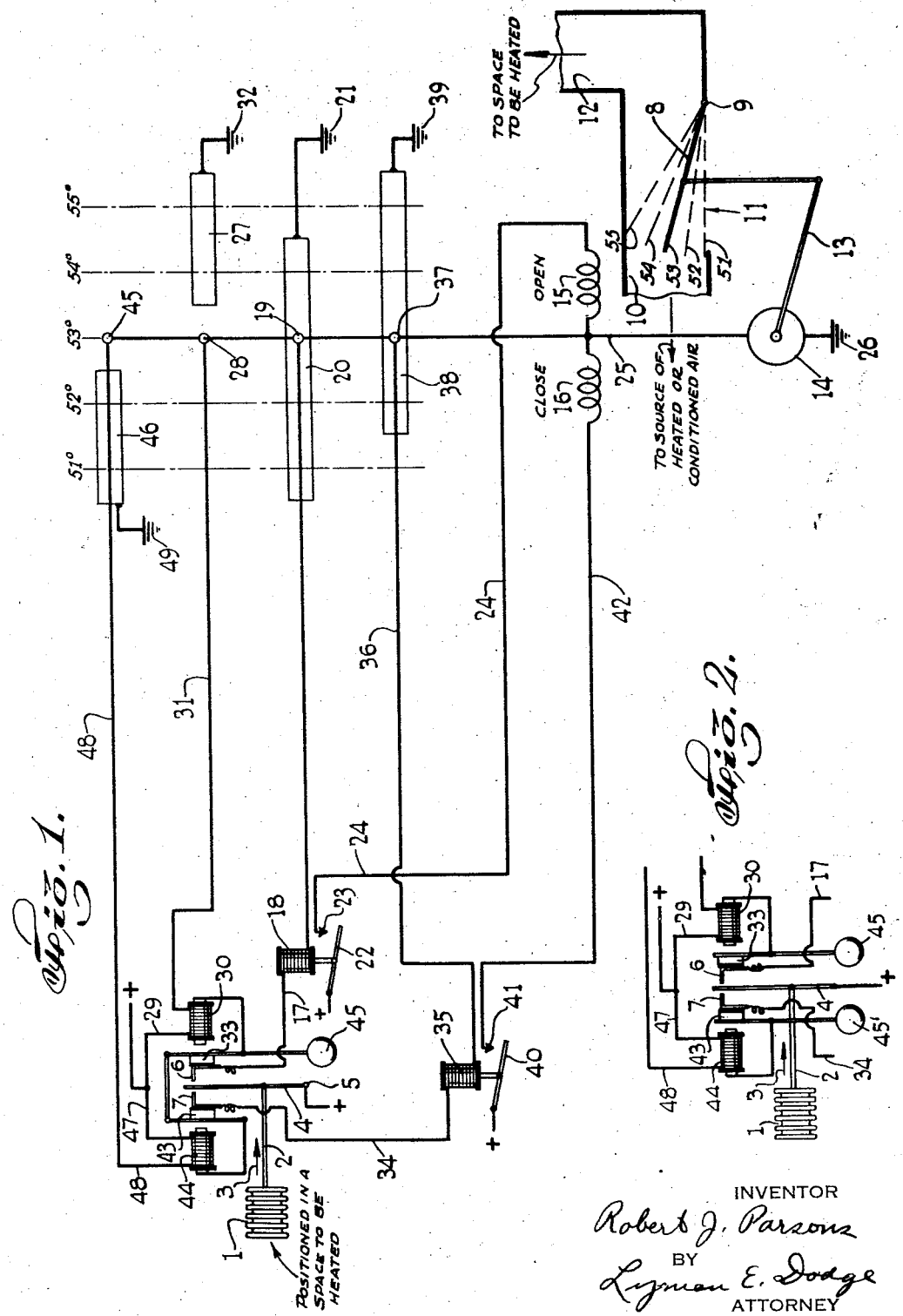

2,409,064

UNITED STATES PATENT OFFICE 2,409,064

DAMPER CONTROL

Robert J. Parsons, Schenectady, N. Y., assignor to Consolidated Car Heating Company, Inc., Albany, N. Y., a corporation of New York Application February 4, 1944, Serial No. 521,036

2 Claims. (Cl. 236—76)

This invention relates to heating and ventilating, particularly the heating and ventilating of a vehicle such as a bus or street car.

A principal object of this invention is the provision of a construction and arrangement whereby heated or conditioned air flowing in a conduit to a space to be heated and/or ventilated may be diverted to a by-pass more or less, by a valve or damper which may be regulated to five positions.

Other objects and advantages will appear as the description of the particular physical embodiment selected to illustrated the invention progresses and the novel features will be particularly pointed out in the appended claims.

In describing the particular physical embodiment selected to illustrate the invention, reference will be had to the accompanying drawing, and the several views thereon, in which like characters of reference designate like parts throughout the several views, and in which:

Figure 1 is a schematic or diagrammatic view illustrative of system embodying my invention;

Fig. 2 is a fragmentary view of a schematic form illustrative of a modified form of my invention.

In the drawing, 1 designates a thermostat. It may be any of the usual or ordinary forms suitable for transmitting mechanical motion. The particular form diagrammatically shown is that of the bellows type. Upon an increase of temperature the liquid or gas within the bellows expands and moves the link 2 in the direction of the arrow 3. Upon a lowering of temperature, the liquid or gas contracts and the bellows collapse moving the link 2 in the direction opposite to the arrow 3.

The link 3 is connected to a conducting lever 4 pivoting at 5. The upper end of the lever 4 is positioned to move between end contact conducting points 6 and 7.

Damper or valve 8 pivoted at 9 is shown as positioned so as to move within a duct or passageway 10. The damper 8, in accordance with my invention, is to have five positions a mid-position and two positions either side thereof. These positions are designated 51 to 55 inclusive. In the 51 position the damper entirely closes the by-pass opening 11. In the 55 position the damper completely closes the duct 10 so that no air flowing therein may pass into the portion of the duct 12 leading to a space to be heated or ventilated. In the intermediate positions the damper 8 partially opens the by-pass 11 and partially closes the duct 10.

This invention aims to control the positioning of the damper 8 by the thermostat 1.

In order to mechanically move the damper 8, it is connected with an electric motor by the mechanical connection 13, 14 being the armature of the motor, 15 the opening field coil, and 16 the closing field coil.

The thermostat 1 is adapted through the other mechanisms shown to operate the motor, having an armature 14, to move the damper 8 to its various positions.

All parts of the device are shown as they would be in the mid or 53° position, that is, when the temperature to which thermostat 1 is exposed is 53°.

If, with all of the parts as shown in the drawing, the thermostat 1, positioned in a space to be heated, is exposed to a temperature of 54°, then the bellows 1 will move the link 2 in the direction of the arrow 3 moving conducting member 4 to the right, as viewed in the figure, causing it to contact finger 6. When this occurs, current flows in a path as follows: positive terminal of a source of potential to pivot point 5, conducting lever 4, conducting finger 6, wire 17, relay coil 18, finger 19, commutator bar 20, and thence by common 21 to the other terminal of the source of potential. Current flowing in the above traced path causes the armature 22 to be raised. When the armature 22 is raised current flows in a path, as follows: positive terminal of the source of potential, relay armature 22, contact point 23, wire 24, opening field coil 15, wire 25, armature 14, and the other terminal of the source of potential by 26. Current flowing in the above traced path energizes the motor and causes its armature to rotate in such direction that the link 13 moves the damper 8 towards and to the 54 position. When this occurs the commutator bearing the strip 27 has been brought under finger 28, whereupon, a circuit is formed in which current flows, as follows: positive terminal of the source of potential wire 29, coil 30, wire 31, finger 28, drum segment 27, and to the other side of the source of potential by 32. Current flowing in the above traced path, energizing coil 30 causes armature 33 bearing conducting point 6 to be moved to the right, as shown in the drawing. This causes contact point 6 to be withdrawn from conducting lever 4 and so breaks the circuit of relay 18 and so the circuit of the electric motor so that the damper 8 remains in the 54 position.

If the temperature to which the thermostat 1 is exposed rises to 55° then conducting lever 4 again contacts finger 6, again energizes relay 18, again causes the motor to operate, and moves the damper 8 to the full 55 position. When the 55° position is reached, the commutator moving synchronously with the motor, has moved contact finger 19 which is no longer in contact with conducting segment 20 because that segment has moved out from under the finger 19, so the relay 18 becomes deenergized, and so the circuit of the motor is broken.

If the decrease in temperature occurs when all of the parts are in the 55° position, as described, then the conducting arm 4 will move away from contact finger 6 to a mid position between fingers 6 and 7 but nothing will happen. However, if the temperature further decreases to 54°, then the conducting lever 4 will contact the contact point 7 and a circuit will be formed in which current will flow, as follows: positive terminal of the source, conducting lever 4, conducting finger 7, wire 34, relay coil 35, wire 36, conducting finger 37, commutator segment 38, and by 39 to the other terminal of the source. Current flowing in the above traced path will raise armature 40 into contact with contact finger 41 and then current will flow in a path as follows: positive terminal of the source, relay armature 40, contact point 41, wire 42, closing field 16, wire 25, armature 14, and by 26 to the other terminal of the source. Current flowing in the above traced path will cause the armature 14 to rotate in a direction such that link 13 will move damper 8 partially toward the closed or 51° position, that is, from the 55 position, to the 53 position. When the damper has arrived at the 53 position the motor will have turned the commutator to such an extent that contact finger 28 will have broken contact with segment 27 and so coil 30 being deenergized armature 33 will move to the left, as viewed in the figure, carrying with it contact point 7, as armature 33 and armature 43 are both connected together to move in unison. When both coils 30 and 44 are deenergized, the armatures take a mid position which may be obtained in any of the usual or ordinary manners as by connecting a pendant weight 45 to them which will always bring them to the mid position when the coils 30 and 44 are deenergized.

After the parts have moved to the 53° position, a further lowering in temperature to 52° will cause the conducting arm 4 to again contact finger 7 and again operate the motor to move the damper 8 toward and to the 52 position. The commutator is so arranged that upon such movement, a contact finger 45 contacts conducting segment 46 and so sets up a path in which current flows, as follows: positive terminal of the source, wire 47, coil 44, wire 48, contact finger 45, segment 46, and by 49 to the other terminal of the source. Current flowing the above traced path will move armature 43 together with contact finger 7 to the left, as viewed in the figure, and so will cause it to separate from conducting lever 4, thus breaking the circuit for the relay 35 and so the circuit for the motor.

Upon a further reduction of temperature the link 2 will move the conducting arm 4 again into contact with contact finger 7 and once again cause the motor to operate and move the damper to the 51 position. When the damper reaches the 51 position the circuit of relay 35 will be broken because at that time contact finger 37 will be out of contact with conducting segment 38, because, due to the operation of the motor, segment 38 will have been moved out from under finger 37.

If, with all of the parts in the 51° position, the temperature rises, so that thermostat 1 is exposed to 52° temperature, the arm 4 will move to a mid position between finger 6 and 7 but nothing will happen. If, however, the temperature rises to 53 then lever 4 will contact finger 6 and establish the circuit previously described by which the motor will be operated and the damper will be moved to the 53 position.

From the hereinbefore given description, it will be apparent that my reflex damper control is such that the damper is moved by steps from the 53° position to the 55° or to the 51° position but after being fully opened or fully closed a fall or rise of 2° is necessary before any operation of the damper takes place.

In Fig. 2, I have illustrated a modification of the arrangement of electro-magnets 30 and 44 and their associated armatures. In this form, 33 and 43 are not connected by a bar so as to move as one.

In the modified form, the operation is somewhat different. If all of the parts are in the 53° position, as shown in Fig. 1, and the temperature of the space to be heated rises to 54°, then in both arrangements, that is, in the arrangement shown by Fig. 1, and the arrangement shown by Fig. 2, the armature of motor 14 will operate and move the damper 8 to the 54 position, whereupon 6 will be withdrawn from in connection with 4. After the temperature rises further to 55°, 4 will again contact 6 and again move the damper so that it will be placed in the 55 position. In the scheme as shown by Fig. 1, as the temperature then drops to 53° in the space to be heated, the damper will operate but in the modified form, as shown by Fig. 2, it will be necessary for the temperature to drop to 52° in the space to be heated before any operation of the damper is effected. This same difference of 3° is necessary for a further operation of the damper after the damper has been placed in the 51 position. In such case the temperature must rise to 54° in the space to be heated before any further operation of the damper is effected.

In the case of the modified form as shown in Fig. 2, two dependant weights, such as 45 and 45', or any usual means will be required to bring the armatures to the normal or unattracted position.

It is to be understood that the drawing is merely diagrammatic and illustrative, so that, in the actual construction of the device of my invention, I will take full advantage of the most advance state of the arts in designing and constructing the several members and parts making up the complete combination and that I will avail myself of the best engineering knowledge for providing suitable insulation in necessary places and constructing relay armature and conducting arms 4 in accordance with the latest and most approved practice for such devices.

I have shown contact between arm 4 and 6 and 7 as made and broken by the mere movement of arm 4 to or away from each of the contacts but this is merely illustrative of the circuit involved and does not by any means indicate that I will exclude the use of micro-switches to be operated in one direction by pivoted arm 4 and to be operated in a contrary direction by pivoted arm 7 and 6.

Although I have particularly described one particular physical embodiment of the idea means underlying my invention, nevertheless, I desire to have it understood that the form selected is merely illustrative but does not exhaust the possible physical embodiments of the idea of means underlying my invention.

What I claim as new and desire to secure by Letters Patent of the United States, is:

1. In a damper control, in combination; two separated juxtaposed contact fingers; a pivoted conducting member positioned therebetween and adapted to pivot so as to touch either of the contact fingers; electro-magnetic members, one positioned adjacent each of the contact fingers and each including an armature bearing a contact finger; means including a device actuated by the temperature of a space to be air conditioned for moving the conducting member into contact with either of the said contact fingers and means alternatively operating to energize one or the other of the electro-magnets to move one or the other of the contacting fingers solely so that it will break contact with the pivoted conducting member.

2. In a damper control, in combination: two separated juxtaposed contact fingers, said fingers having an unoperated position and an operated position, means normally biasing the contact fingers to unoperated position; a pivoted conducting member positioned therebetween and adapted to pivot so as to touch either of the contact fingers; electro-magnetic members, one positioned adjacent each of the contact fingers and each including an armature bearing a contact finger; means including a device actuated by the temperature of a space to be air-conditioned for moving the conducting member into contact with either of the said contact fingers and means for energizing either one or the other of the electro-magnetic members whereby either one or the other of the contact fingers may be separated from the pivoted conducting member.

ROBERT J. PARSONS.